United States Patent [19]
Benker, Jr.

[11] 3,913,375
[45] Oct. 21, 1975

[54] SELF LUBRICATING TOOL

[75] Inventor: Frederick H. Benker, Jr., Plainville, Mass.

[73] Assignee: Texas Instruments Incorporated, Dallas, Tex.

[22] Filed: May 28, 1974

[21] Appl. No.: 473,843

[52] U.S. Cl. ............... 72/463; 184/5; 308/4 C; 308/5 R
[51] Int. Cl.² .............. B21D 37/18; F16N 1/00
[58] Field of Search ....... 83/169, 637; 308/4 C, 5 R; 184/5; 72/45, 463

[56] References Cited
UNITED STATES PATENTS

| | | |
|---|---|---|
| 1,729,898 | 10/1929 | Ruggles .............................. 83/637 |
| 2,288,136 | 6/1942 | Janiszewski ........................... 308/4 |
| 2,422,774 | 6/1947 | Conner ................................ 308/4 |
| 2,523,358 | 9/1950 | Conner ................................ 308/5 |
| 2,877,063 | 3/1959 | Janiszewski .......................... 83/169 |

*Primary Examiner*—Lowell A. Larson
*Attorney, Agent, or Firm*—John A. Haug; James P. McAndrews; Russel E. Baumann

[57] ABSTRACT

A high speed die set has a guide post and bushing in the die set arranged to serve as a pump during relative movement of parts of the die set and has conduits connecting various post and bushing combinations serially throughout the die set, the conduits including check valves at inlet and outlet connections of the conduits to a lubricant reservoir.

8 Claims, 5 Drawing Figures

3,913,375

SELF LUBRICATING TOOL

BACKGROUND AND SUMMARY OF INVENTION

Lubrication for high speed die sets is a continuing problem. With high speed die set presses operating at speeds over 1000 strokes per minute, it becomes extremely important that proper lubrication be supplied between the die posts and bushings which are in sliding engagement with each other for guiding relative movement between the die parts of the die set. To achieve this lubrication, an external pump can be used to pump lubricant to the die guide post and bushings. However, with the use of an external pump, careful attention must be used to insure the proper pressure setting is made and the volume of lubricant in the system is held fairly constant. If the pressure used is too high, excessive lubricant will flow over the tool. Also, improper lubrication will result if the volume being pumped is not held constant. If the pressure used is too low, the lubricant will not have the force to insure adequate flow through the entire system.

It is an object of this invention to provide a novel system for lubricating the die set; to provide means within the die set, utilizing a die post and bushing combination in the die set, for insuring flow of lubricant through the die set; to provide for a less complex lubricating system in the die set which is inexpensive to make; and to provide for a lubricating system which is free from operational problems such as pressure control, blockage, and pump maintenance. Other objects and features will be in part apparent and in part pointed out hereafter.

The self lubricating tool of this invention has a guide bushing closed at one end and arranged to cooperate with a guide post reciprocating in the bushing to serve as a pump. The lubricant is drawn into a well between the guide post and bushing from an external lubricant reservoir as the die parts of the die set move in one direction relative to each other. As the press moves the die parts in the opposite direction, the lubricant is moved through ducts in either the guide posts or bushings and then through conduits extending between the various guide bushings. Check valves are used at the exit and entrance of the reservoir to permit the flow of lubricant in only one direction. So from the reservoir, the lubricant flows through the check valve through a conduit serially connected to the various guide post and bushing combinations and back into the lubricant reservoir after passing through a check valve. This system offers the advantage of being much less complex and much more reliable than one using an external pump and is less expensive to make and operate. It also has the advantage of supplying lubricant at intermittent high pressure which does a good job of lubricating the guide post and bushing interfaces while avoiding excess lubrication leaks and accordingly the need for a relief valve at each of the guide bushings.

The invention accordingly comprises the construction hereinafter described, the scope of the invention being indicated in the following claims.

In the following drawings in which one of the various possible embodiments of the invention is illustrated, FIG. 1 is a side view of apparatus made according to the invention;

Figure 2:
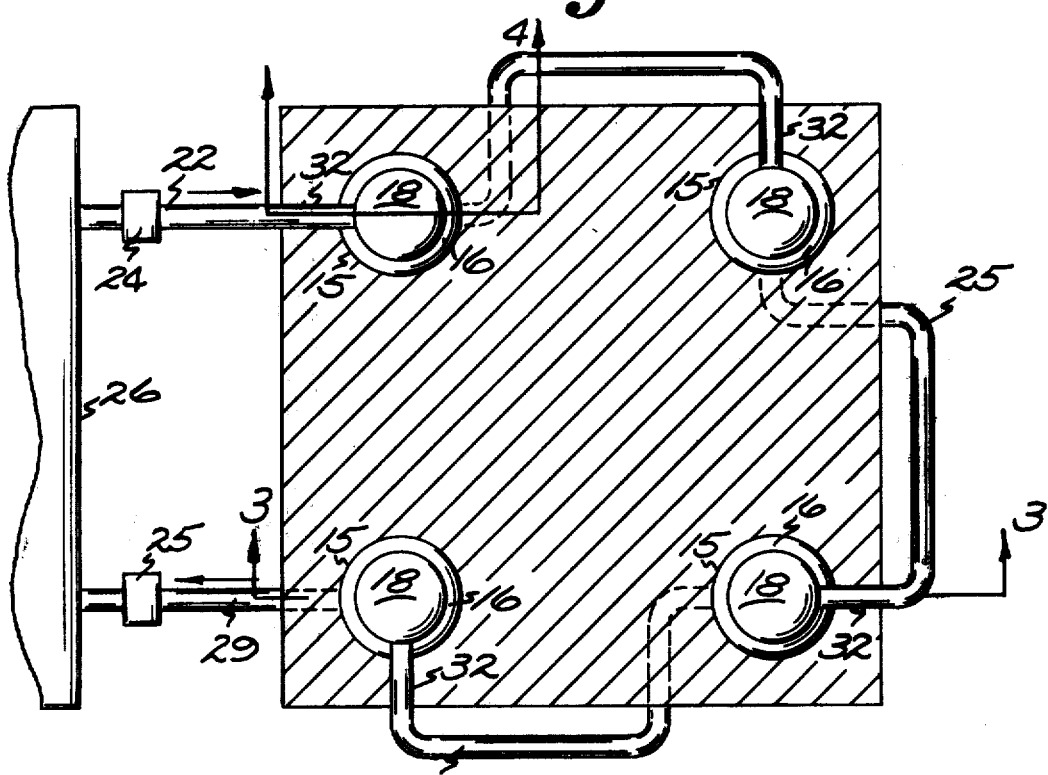
FIG. 2 is a section view along line 2—2 of FIG. 1.
Figure 4:
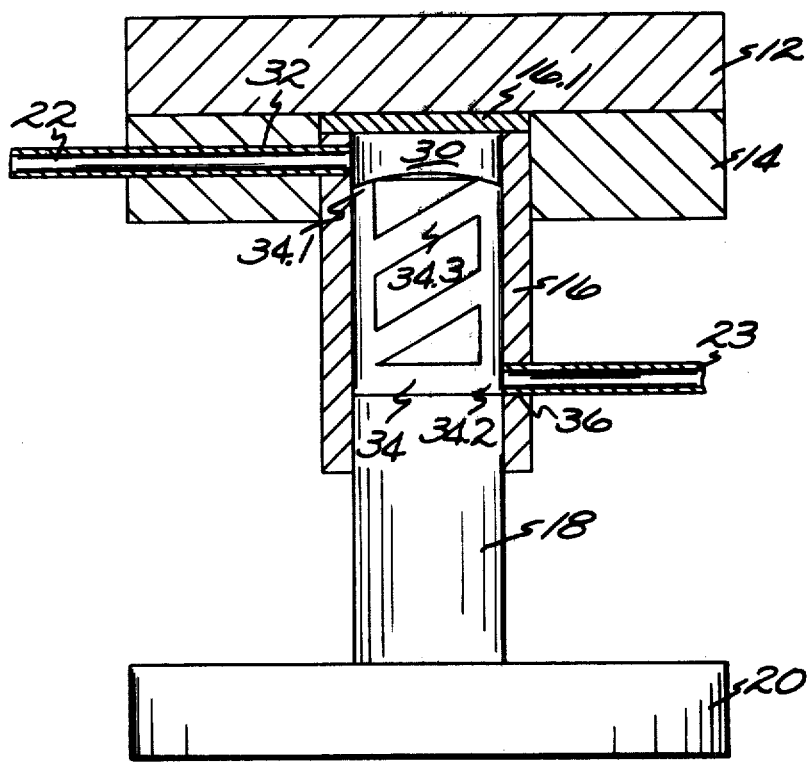
Figure 5:
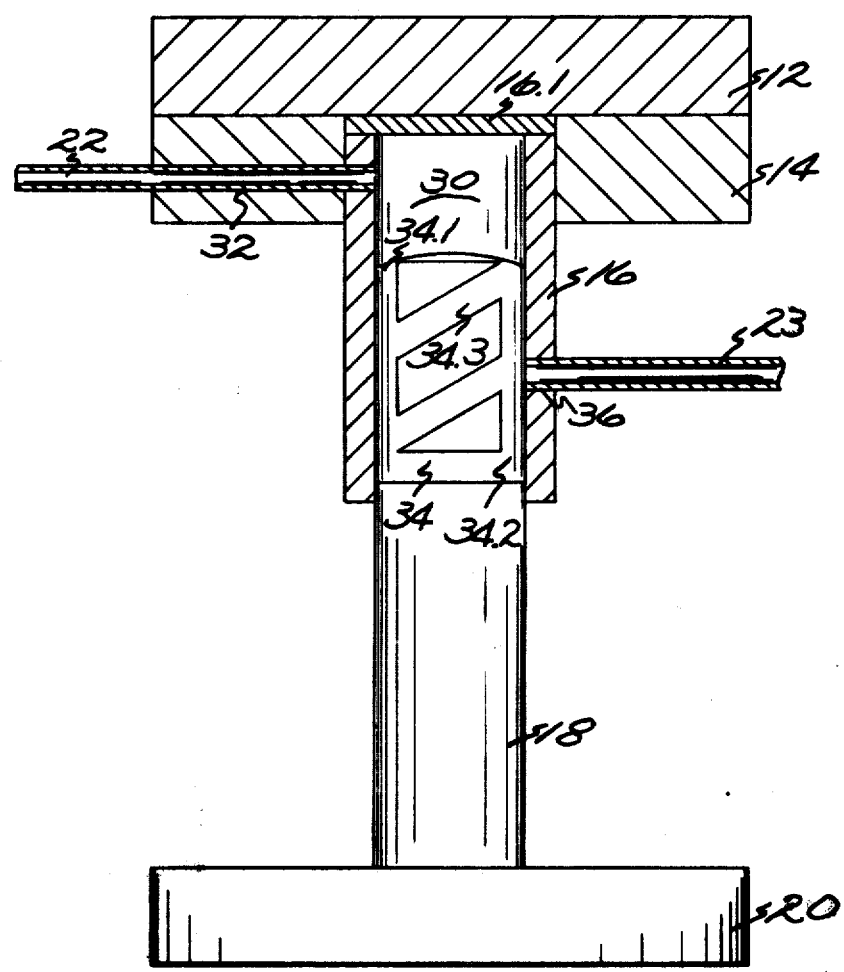

FIG. 4 is a partial section view to enlarged scale along 4—4 of FIG. 2 illustrating oil flow in a guide post and bushing combination in the die set of this invention when the guide post and bushing are in the position of maximum disengagement; and FIG. 5 is a partial section view corresponding to FIG. 4 illustrating oil flow in a guide post and bushing combination in a die set of this invention when the guide post and bushing are in the position of minimum disengagement.

Corresponding reference characters indicate corresponding parts throughout the several views of the drawings.

Figure 1:
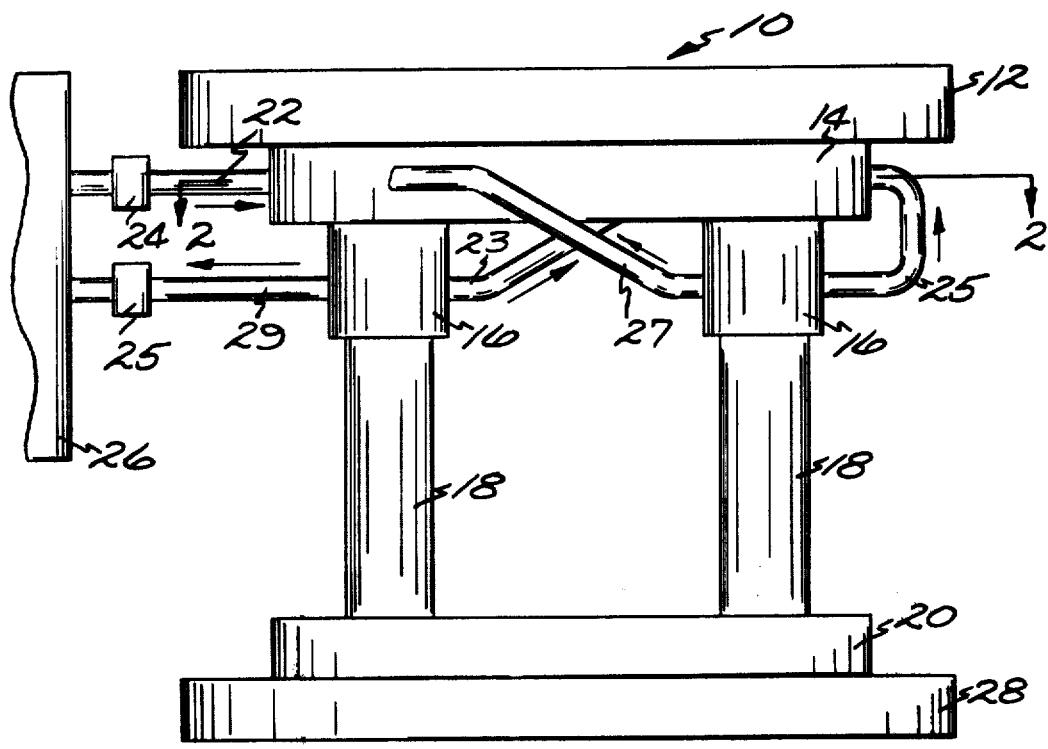
Figure 3:
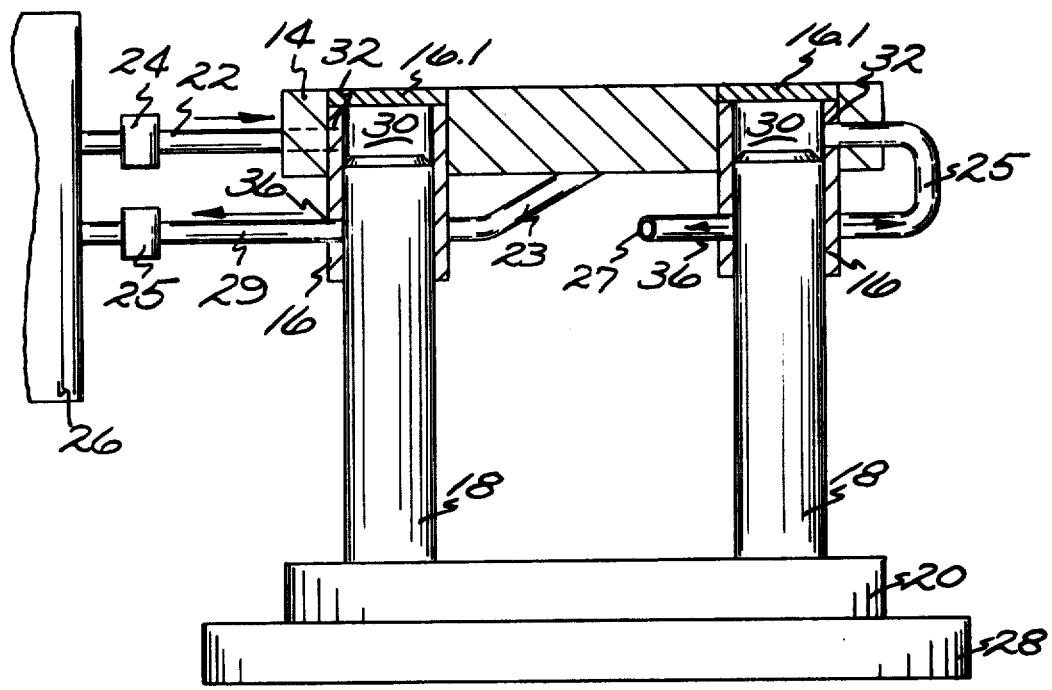
FIG. 3 is a section view along line 3—3 of FIG. 2.

Referring to the drawings, the self-lubricating tool of this invention includes a die set indicated generally at 10 in FIGS. 1 and 2. The die set has a die set top 14 secured to a ram adapter plate 12 and has a die set bottom 20 secured to a base plate 28 of a die press. Such a die press is of conventional design and, without further description herein, it will be understood that such a die press is adapted to move the die set top 14 reciprocally with respect to the die set bottom 20 for forming or otherwise machining metal material disposed between the die components. One of these die components, preferably the die set bottom 20, is bored to accept a plurality of guide post 18 which have one end anchored in the die set bottom and the other which extends upward toward the die set top 14 in the direction of the reciprocal movement of the die set top 14. The die set top is also provided with bores 15 as shown in FIG. 2 to accept a plurality of complimentary guide post bushings 16 which are anchored in the bores 15 in the die set top and are press fitted into the bores in the die set top and extend out of the bores 15 as illustrated in FIGS. 1 and 3. These bores are positioned to permit sliding movement of the guide post bushings in a telescoping manner over the guide post 18 during reciprocal movement of the die set top and bottom.

In accordance with this invention, each of the guide bushings 16 has an open end for receiving a guide post 18 therein and, in accordance with this invention, at least one of the bushings is also provided with a closed end bushing cap 16.1 as shown in FIGS. 3, 4 and 5. In this arrangement, the closed end of this bushing 16 cooperates with the guide post 18 sliding therein to define a wall 30 between the end of the guide post and the walls of the bushing. Thus, when the die set top and bottom are at one limit of the noted reciprocal movement, the well 30 is provided with a relatively large volume as shown in FIG. 5. However, when the die set top and bottom are at the other limit of the noted reciprocal movement as shown in FIG. 4, the volume of the well 30 is substantially smaller. It should be noted that, although the closed end bushing cap 16.1 of the guide bushing illustrated in FIGS. 3, 4 and 5 is used to close the bushing, this bushing end could be closed by a portion of the die set top 14 or by other means such as the ram adapter plate 12 within the scope of this invention. Further, although only one of the bushings 16 is shown in FIGS. 4 and 5, it will be understood that all of the bushings 16 are preferably provided with one closed end in the tool of this invention.

In accordance with this invention a plurality of bores 32 are also made in the die set top to extend into the guide bushings 16 from respective sides of the die set top as shown in FIG. 2, these additional bores typically being located to open into the bushing 16 adjacent the closed end of the bushing as viewed in FIGS. 3, 4 and 5.

Other additional bores 36 are positioned in the guide bushings adjacent the open ends of the bushings as is best illustrated in FIGS. 3, 4 and 5.

In accordance with this invention, the self-lubricating tool 10 includes a lubricant reservoir 26, preferably located external to the die set top and bottom as shown in FIGS. 1-3. This lubricant reservoir is provided with a conduit 22 leading from the reservoir to one of the bores 32 formed in the die set top for permitting lubricant flow to one of the guide bushings 16. An additional conduit 23 is then arranged to extend from the other bore 36 near the open end of that bushing 16 to the bore 32 in one of the adjacent bushings 16 in the die set top. Additional conduits 25 and 27 are similarly arranged extending between the bottom bore 36 in one bushing 16 and the top bore 32 in another bushing 16 so that all of the bushings 16 in the die set top are serially connected with each other as will be understood. An additional conduit 29 is then arranged to lead from the bottom bore 36 in the last bushing 16 in the noted series to extend back to the lubricant reservoir 26. Check valves 24 and 25 are preferably located in the conduit sections 22 and 29 respectively for regulating lubricant flow from and to the lubricant reservoir 26 and between the guide bushings 16 in a single direction, preferably clockwise as shown in FIGS. 1 and 3. As will be understood, any suitable flexible or rigid hydraulic tubing is used for forming the conduits 23, 25, 27, 29 and the conduits are secured in the die set bores 32 and 36 in any conventional manner. Also within the scope of this invention, the guide posts and die set bottom can be bored out to provide the conduit system for the flow of lubricant.

In accordance with this invention, the guide bushings 16 or the guide post 18 are provided with lubricant flow grooves or ducts 34 for permitting controlled lubricant flow through each guide bushing 16 between the bores 32 and 36 extending into the guide bushings as shown in FIGS. 4 and 5. Note that these ducts 34 are omitted in FIGS. 2 and 3 for clarity of illustration. Typically, for example, as shown in FIGS. 4 and 5 each guide post 18 is provided with duct end portions 34.1 and 34.2 which remain aligned with or in open access to the bores 32 and 36 respectively during reciprocal movement of the die set top and bottom and which approach the ends of, but do not extend outside of the open ends of the guide bushings 16 even at the limits of reciprocal movement of the die set. These duct portions 34.1 and 34.2 are then interconnected by an intermediate duct portion 34.3 which preferably extends spirally around the guide post. As will be understood the guide post 18 and guide bushings 16 are preferably proportioned to permit relative movement of the posts and bushings in close interfitting relationship so that, with a lubricant of selected viscosity disposed in the ducts 34 under a selected fluid pressure, the lubricant tends to remain in the ducts or at least to flow out of the ducts over the interfacial surfaces of the guide posts and bushings at a relatively slow rate but so that, with increased fluid pressure applied to the lubricant in the ducts 34, the lubricant is forced out of the ducts over the noted interfacial surfaces at a selected faster rate. In this arrangement, it can be seen that the ducts 34 cooperate with the bores 32 and 36 in the guide bushings and with the conduits 23, 25, 27 and 29 to form a continuous lubricant flow passage from the lubricant reservoir 26, through the die set, and back to the lubricant reservoir. It will be understood that although the ducts 34 are shown in the guide post 18, the ducts could also be formed in the inner walls of the bushings 16 within the scope of this invention.

Advantageous operation of the die set 10 of this invention is then achieved. That is, as the die set moves to the relative position as shown in FIG. 5 from the position shown in FIG. 4, the well 30 is increased in volume creating a vacuum or suction which draws lubricant from the reservoir 26 through the conduit section 22, the bore 32, and the check valve 24 into the well 30. The close interfitting of the guide post 18 in the bushing 16 shown in FIGS. 4 and 5, permits this suction to be drawn with sufficient force to move lubricant from the reservoir into the well 30. Then, as the die set moves from the position shown in FIG. 5 to the position shown in FIG. 4 during reciprocal movement of the die set, the lubricant thus drawn into the well 30 is expelled from the well at a substantial fluid pressure and flows through the ducts 34 in the guide post 18, through a bore 36 into the conduit section 23. As will be understood, this lubricant flow also occurs simultaneously in each of the guide post bushing combinations in the die set 10. Further as this fluid pressure is applied to the lubricant in the die set, some lubricant is forced out of the ducts 34 in the various guide posts to flow over the interfacial surfaces of the various guide post and bushing combinations, this lubricant flow outside the ducts then being distributed over these interfacial surfaces by the reciprocal sliding movement of the posts in the various bushings. Note that, where none of the ducts 34 extend out of the bushing 16 as previously noted, even at the extreme limits of reciprocal movement of the die set top and bottom, very little lubricant is lost or flows outside the tool during the brief period that the high fluid pressure is applied to the lubricant in the ducts 34. As will be understood reciprocal movement of the die set top and bottom, intermittently applies the noted fluid pressure to the lubricant in the ducts 34 and alternately applies a suction force tending to hold the lubricant from flowing out of the bushings 16. Further, because the lubricant flow tends to be guided through the tool 10 in either the ducts 34, the bores 32 and 36, or the various conduit sections, extraneous materials caught up in the lubricant tend to flow through these passages without being trapped on the sliding interfacial surfaces in the guide posts and bushings. As will be understood, the check valve 25 in the conduit return to the lubricant reservoir 26 is not required but can serve to insure that a desired fluid pressure level is achieved in the lubricant during reciprocal movement of the die set parts. In this way, it can be assured that sufficient lubricant pressure is achieved intermittently to clear any blockages or stoppages in the described lubricant flow passages even though, because of the intermittent occurrence of this high lubricant pressure, excessive lubricant usage or loss does not take place.

Other embodiments can be made wherein each die guide post and bushing combination is constructed with conduits leading directly from and back to the lubricant reservoir so that the lubrication of each guide post and bushing is independent of the other ones. Also other various changes could be made in the above constructions without departing from the scope of the invention. It is intended that all matters contained in the

I claim:

1. A self-lubricating die tool comprising at least two relatively movable die parts, a plurality of guide posts mounted in one of said die parts, a plurality of guide post bushings mounted in the other of said die parts, said bushings each having an open end for receiving respective guide posts in sliding telescoping relation therein with interfacing surfaces of said guide post and bushing in closely sliding relation to each other for guiding reciprocal movement of said die parts relative to each other, at least one of said guide post bushings having a closed end cooperating with the guide post therein during said reciprocal movement to define a well of alternately increasing and decreasing volume; a lubricant reservoir; a conduit means extending from said reservoir to said first well; a second conduit means serially interconnecting said guide post bushings; and finally a conduit means extending from last of said bushing in serial relationship to said lubricant reservoir; lubricant is drawn from reservoir through said conduit into the first well when well volume is increased and then pumped between interfacial surfaces on the decreasing volume stroke and then on to the remaining guide post and bushings through the serially connecting conduit.

2. A tool or die as in claim 1 using check valve means in said conduit to limit the flow of lubricant to one direction from reservoir through the various die guide post and bushing interfaces and back into the reservoir.

3. A tool or die set as in claim 1 wherein each of said guide posts have lubricant flow ducts extending along a substantial length of the post to allow better lubrication of the interfacial areas of the die guide post and bushing during their reciprocal movement with relation to one another.

4. A tool or die set as in claim 1 wherein each of said guide post bushings have lubricant flow ducts extending along the guide post bushing to allow better lubrication of the interfacial area of the guide post and bushing during their reciprocal movement with relation to one another.

5. A tool or die set as in claim 3 wherein the lubricant flow ducts extending along the substantial length of the post are always covered by the complementary guide post bushing during their reciprocal movement with relation to one another.

6. A tool or die set as in claim 5 where each of the guide post and bushing combinations are close ended having a well of increasing and decreasing volume formed during the reciprocal movement of the cooperating guide post and bushing combination.

7. A tool or die set as in claim 6 where the various conduit means are flexible hydraulic tubing.

8. A tool or die set as in claim 7 using check valve means in said hydraulic tubing to limit the flow of lubricant to one direction from said reservoir through the various die guide post and bushing interfaces and back into the reservoir.

* * * * *